(12) United States Patent
Watt (10) Patent No.: US 8,994,513 B2
(45) Date of Patent: Mar. 31, 2015

(54) ADAPTIVE MULTI-SENSOR HANDHELD COMPUTING DEVICE

(75) Inventor: Alex Watt, Everton (CA)

(73) Assignee: Psion Inc., Mississauga, Ontario (CA)

( * ) Notice: Subject to any disclaimer, the term of this patent is extended or adjusted under 35 U.S.C. 154(b) by 614 days.

(21) Appl. No.: 12/649,968

(22) Filed: Dec. 30, 2009

(65) Prior Publication Data

US 2011/0156869 A1    Jun. 30, 2011

(51) Int. Cl.
| | |
|---|---|
| *G05B 23/00* | (2006.01) |
| *G06K 7/00* | (2006.01) |
| *G06K 7/10* | (2006.01) |
| *G06K 7/14* | (2006.01) |

(52) U.S. Cl.
CPC .......... *G06K 7/0004* (2013.01); *G06K 7/10891* (2013.01); *G06K 7/1095* (2013.01); *G06K 7/14* (2013.01); *G06K 7/1443* (2013.01); *G06K 7/1447* (2013.01)
USPC .................................................. 340/10.51

(58) Field of Classification Search
USPC ............ 340/10.1, 572.2, 572.1, 505; 342/125
See application file for complete search history.

(56) References Cited

U.S. PATENT DOCUMENTS

| | | | | |
|---|---|---|---|---|
| 5,902,988 | A | * | 5/1999 | Durbin .................... 235/472.01 |
| 6,138,915 | A | | 10/2000 | Danielson et al. |
| 7,030,761 | B2 | * | 4/2006 | Bridgelall et al. ......... 340/572.2 |
| 7,212,127 | B2 | * | 5/2007 | Jacober et al. ............. 340/572.8 |
| 7,639,142 | B2 | * | 12/2009 | Roeder et al. ............. 340/572.4 |
| 8,305,192 | B2 | * | 11/2012 | Connolly et al. ............ 340/10.1 |
| 2006/0267730 | A1 | | 11/2006 | Steinke et al. |
| 2006/0267733 | A1 | * | 11/2006 | Steinke et al. ............... 340/10.1 |
| 2008/0237351 | A1 | * | 10/2008 | Goren et al. .................. 235/470 |
| 2009/0066509 | A1 | | 3/2009 | Jernstrom et al. |

OTHER PUBLICATIONS

European Search Report mailed Apr. 8, 2011 in counterpart European Patent Application No. 10191471.

* cited by examiner

*Primary Examiner* — Vernal Brown (57) ABSTRACT

A handheld computing system for adaptive multi-sensor, a manipulator grip and its method is provided. The system includes plurality of sensor systems for sensing characteristics of a physical object as well as a distance analyzer for dynamically determining the activation of at least one of the sensor systems based on a distance to the object and predetermined criteria. Characteristics include an identifier and one or more attributes for contributing to identification of the object. Additions to the system include a display for displaying the object's image and having an analysis field and a zoom for placing a specific captured characteristic of the object in the analysis field. Additions to the handheld computing system further include a handheld ergonomic data input device for operating a handheld computing device.

3 Claims, 6 Drawing Sheets

ADAPTIVE MULTI-SENSOR HANDHELD COMPUTING DEVICE

FIELD OF INVENTION

The present invention relates to a sensor technology, and more specifically to a handheld computing device having an adaptive multi-sensor.

BACKGROUND OF THE INVENTION

Handheld data capture devices (e.g., RFID readers, bar code scanners) are used in a variety of applications, such as tracking items and inventory management. For example, an RFID reader collects information on an item by reading RFID tags attached on the items. A bar code scanner scans a bar code label attached to the item.

However, these conventional handheld data capture devices have a problem in that they could collect wrong information. For example, the RFID reader could read an RFID tag attached to an item adjacent to the item of interest. A bar code could be scanned from a wrong item, especially when using a wide spread laser beam or poorly framed imaging scanner on a collection of bar coded items in close proximity. Further, these conventional handheld data capture devices cannot collect the item's information when their identifiers are damaged. Thus, in a warehousing and materials handling environment, skilled personnel would need to investigate each item to determine the appropriate disposition or manually apply new identification information to an item when the item is not identified or incorrectly identified or damaged. This causes delay in delivering the items to the end customer. Therefore, there is a need to provide a handheld device that can reliably capture identification data from an item and validate that data.

In addition, the operator of a handheld data capture device is required to manually aim the device at an item of interest and then operate the device. Thus, there is a need to provide a handheld device that can be easily operated, often using one hand only.

SUMMARY OF THE INVENTION

It is an object of the invention to provide a method and system that obviates or mitigates at least one of the disadvantages of existing systems.

According to an embodiment of the present invention there is provided a handheld computing system, which includes: a plurality of sensor systems for sensing characteristics of a physical object, the characteristics including at least one identifier; and a distance analyzer for dynamically determining an activation of at least one of the sensor systems based on a distance to the physical object and pre-determined criteria.

According to an embodiment of the present invention there is provided a handheld computing system, which includes: a plurality of capturing systems for capturing a plurality of characteristics of a physical object, the characteristics including an identifier attached to the physical object and one or more attributes for contributing to identification of the physical object; a display for displaying an image of the physical object, having an analysis field; and a zoom mechanism for placing a specific captured characteristic of the physical object in the analysis field.

According to an embodiment of the present invention there is provided a method of capturing and identifying a physical object, which includes: capturing a plurality of characteristics of a physical object via an optical path, a radio frequency path or a combination thereof, the plurality of characteristics including an identifier attached to the physical object and one or more attributes for contributing to identification of the physical object; evaluating one or more available captured characteristics; and validating the identifier based on the evaluation.

According to an embodiment of the present invention there is provided a handheld ergonomic data input device for operating a handheld computing device having a sensor, which includes: an enclosure having a grip surface contoured to fit the palm of a user's hand and a support surface for mounting the handheld computing device; a detection mechanism for detecting the movement of fingers of the hand, including: a rocking switch having at least two states and operated by the first and second fingers of the hand; a single state switch operated by a third finger of the hand; and a squeeze switch operated by squeezing the grip with the hand.

According to an embodiment of the present invention there is provided a handheld computing unit, which includes: a handheld computing device including: a plurality of capturing systems for capturing a plurality of characteristics of a physical object, the plurality of characteristics including an identifier attached to the physical object and one or more attributes for contributing to identification of the physical object; a processor for adaptively selecting the capturing system and validating the identifier with one or more available captured characteristics, a manipulator grip shaped for fitting the palm of a user's hand, for operating the handheld computing device with the hand, the manipulator grip including: a mounting surface for mounting the handheld computing device; an entry mechanism operated by the hand; and an interface for transferring a signal associated with the operation of the data entry mechanism to operate the handheld computing device.

BRIEF DESCRIPTION OF THE DRAWINGS

These and other features of the invention will become more apparent from the following description in which reference is made to the appended drawings wherein.

DETAILED DESCRIPTION

Referring to FIGS. 1-6, one example of a handheld computing unit in accordance with an embodiment of the present invention is described in detail. The handheld computing unit 2 of FIG. 1 includes a handheld computing device 10 and a manipulator grip 100. The handheld computing unit 2 is a mobile device having a rechargeable battery. The battery may be located in the handheld computing device 10, the manipulation grip 100, or a combination thereof. The handheld computing device 10 is a portable (mobile) computer having an adaptive multi-sensor for capturing data associated with a physical object 4. The handheld computing device 10 may be a stand-alone device. The handheld computing device 10 is operably connectable to the manipulator grip 100. When the handheld computing device 10 is coupled to the manipulation grip 100, the handheld computing device 10 is operable via the manipulator grip 100. The manipulator grip 100 is a one-hand ergonomic data input device that mounts the handheld computing device 10, which allows the user to held and operate the entire system 2.

Figure 1:
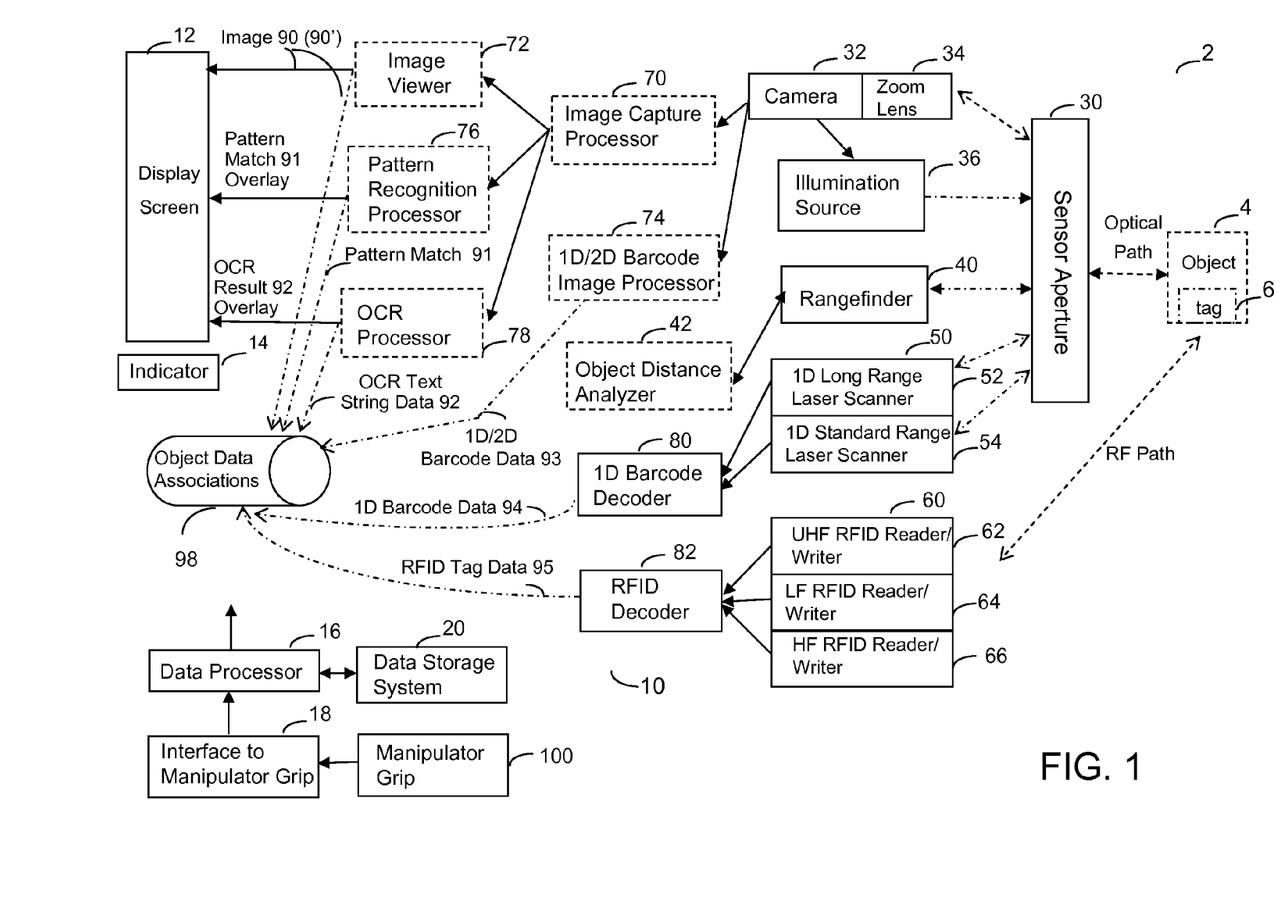
FIG. 1 is a diagram illustrating a handheld computing unit having a handheld computing device and a manipulator grip in accordance with an embodiment of the present invention.

The physical object 4 typically has at least one encoded data identifier (e.g., RFID tag, 1D/2D bar code). In FIG. 1, an RFID tag 6 is attached to the physical object 4. The RFID tag 6 includes a memory storing information (e.g., identification). The physical object 4 may have one or more 1D/2D bar code labels attached to it. In this example, the physical object 4 has one or more attributes that contribute to identification of the physical object itself, such as a specific size, shape and color, one or more text objects, of which some may be associated with particular bar code labels, one or more printed graphic objects, or combinations thereof.

Both bar codes and RFID tags have checksums built into them, which ensure the data read out is correct. The problem occurs when they cannot be read: they may be on the wrong item, or a bar code/tag may be read on an adjacent item from the one intended; the bar code/tag may be damaged. The handheld computing device 10 uses multiple sensor technologies including identification/image analyzing technologies (1D/2D bar codes, RFID, pattern recognition, OCR) for capturing data associated with the physical object 4 and corroborates or validates the object's identification data by using the additional captured data. The handheld computing unit 2 maximizes the likelihood that the data identifiers for a certain physical object are valid and simplifies the process of material exception handling (such as when bar codes are damaged, the physical objects are damaged or RFID tags are corrupted).

The handheld computing device 10 includes algorithms that are configurable to selectively activate or enable some processors (e.g., sensors), corroborate and/or validate the object identifiers through alternative sensors. For example, an RFID tag embedded in the object may be validated by a certain bar code on the physical object 4 which in turn is corroborated by a pattern match against the manufacturer's logo on the physical object 4.

The manipulator grip 100 allows the user to support the weight of the handheld computing device 10 and aim a data capture system (e.g., 30 of FIG. 1) of the handheld computing device 10 without restriction, put the key characteristics of the target object within an analysis frame on a display and trigger the analysis via user interfaces on the system 2. The manipulator grip 100 may control some of the user interfaces. The manipulator grip 100 includes a detection mechanism (e.g., triggers, switches) of detecting the user's actions, and converting the actions into signals that are processed within the handheld computing device 10. The detection mechanism provides tactile feedback to the user. Signals from the manipulator grip 100 may be transferred to the handheld computing device 10 using any of: optical signaling, electrical signaling, or magnetic signaling.

Some default algorithms for the operation of the handheld computing unit 2 may be provided, and the customer may optimize them for applications. The user may be prompted for alternative courses of action, including, for example, but not limited to, taking a picture of the bar code or item, and typing in the bar code text manually. These prompts would be context sensitive and the user could navigate and select the responses using the controls on the manipulator grip 100.

The handheld computing unit 2 is, for example, but not limited to be used to track or manage the physical object 4 in an environment, such as, but not limited to: front store retail, warehousing for mobile stock checking, price checking, perishable goods monitoring, couriers, merchandising, security area, manufacturing process monitoring of goods (e.g. pharmaceuticals, food), utilities for meter reading, parking enforcement, and asset tracking.

In one example, the handheld computing unit 2 implements capturing an image of the physical object 4 and displaying the image (202 and 204 of FIG. 4), analyzing the distance to the physical object 4 (206 of FIG. 4), selecting the sensors based on the distance (208 of FIG. 4) to capture and decode the identifier of the physical object 4 (210 of FIG. 4) (e.g., decoding a 1D or 2D bar code attached to the physical object 4, accessing an RFID tag embedded within the object 4), and further capturing/identifying the characteristics of the physical object 4 (212 of FIG. 4) (e.g., pattern matching the characteristic of the physical object 4, optically recognizing the text of the physical object 4). The handheld computing unit 2 corroborates or verifies the identification data (e.g., a bar code, RFID tag) with the captured characteristics (214 of FIG. 4). The handheld computing unit 2 evaluates available characteristics of the physical object 4 to validate the identification data, and associates the captured characteristics of the physical object 4 with the identification data in a database for further processing.

For example, LF and HF RFID readers may read a wrong tag, for example, when the tags are embedded in courier envelopes and the envelopes are on top of one another. In another example, UHF RFID readers generally have a read range exceeding several meters, and thus may read RFID tags attached to adjacent objects, rather than from a physical object of interest. In a further example, broken case and fast pick operations may deal with many small items in close proximity, all or some of them with identifiers (e.g., tags, bar codes). In these cases, the validation of the captured data maximizes the data reliability.

Figure 4:
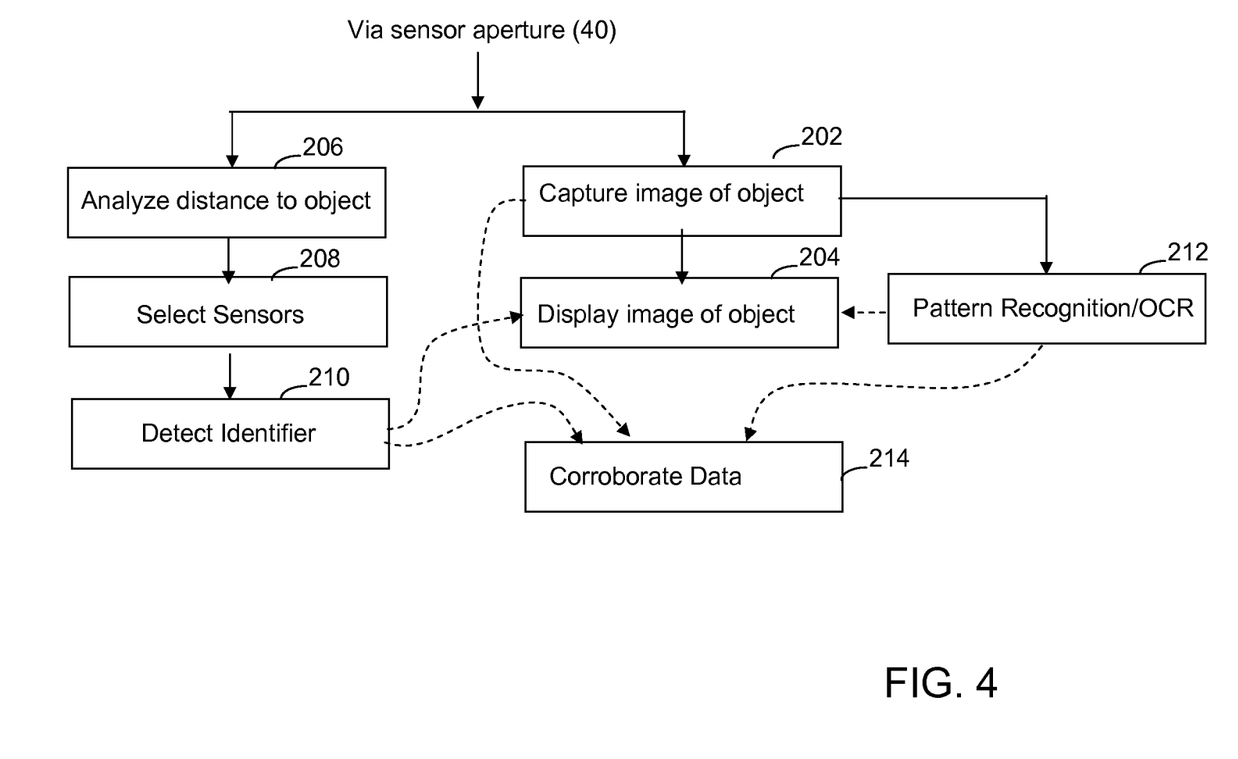
FIG. 4 is a flow chart illustrating one example of an operation process for the handheld computing unit of FIG. 1.
Figure 5:
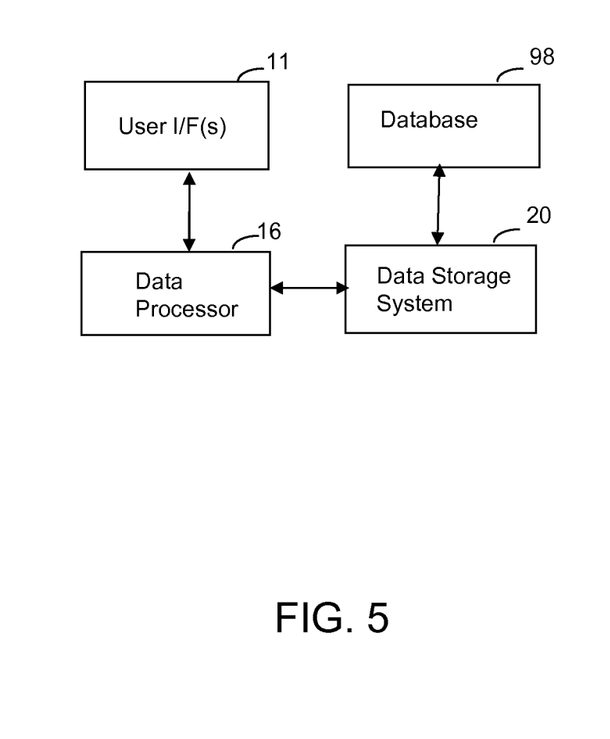
FIG. 5 is a diagram illustrating a user interface, a data processor and a data storage system in the handheld computing device of FIG. 1.

In FIG. 4, the image captured at 202 is used for pattern recognition/optical character recognition (OCR). However, the image captured at 202 may be also used to detect the identifier of the physical object 4 (e.g., barcode image processor 74 of FIG. 1).

The manipulator grip 100 is used to trigger or operate the handheld computing device 10 (e.g., 202-214 of FIG. 4). At the displaying step 204, the manipulator grip 100 may be used to zoom in and place the object of interest in the analysis field on the display. In addition, as an option, an overlay highlight may be displayed in the analysis field to show what identifier was read (such as a box around a bar code on the item).

For example, the bar code being decoded is identified by the overlay box being drawn around it. In one scenario, the analysis field selected shows multiple bar codes on the object. The user operates one of the buttons on the manipulator grip 100 to sequence through the bar codes in the analysis field and to choose the specific one desired where each barcode may be decoded in turn, and highlighted with the overlay box. When the box appears over the bar code of interest, the user pushes another button to 'accept' that bar code.

Figure 3:
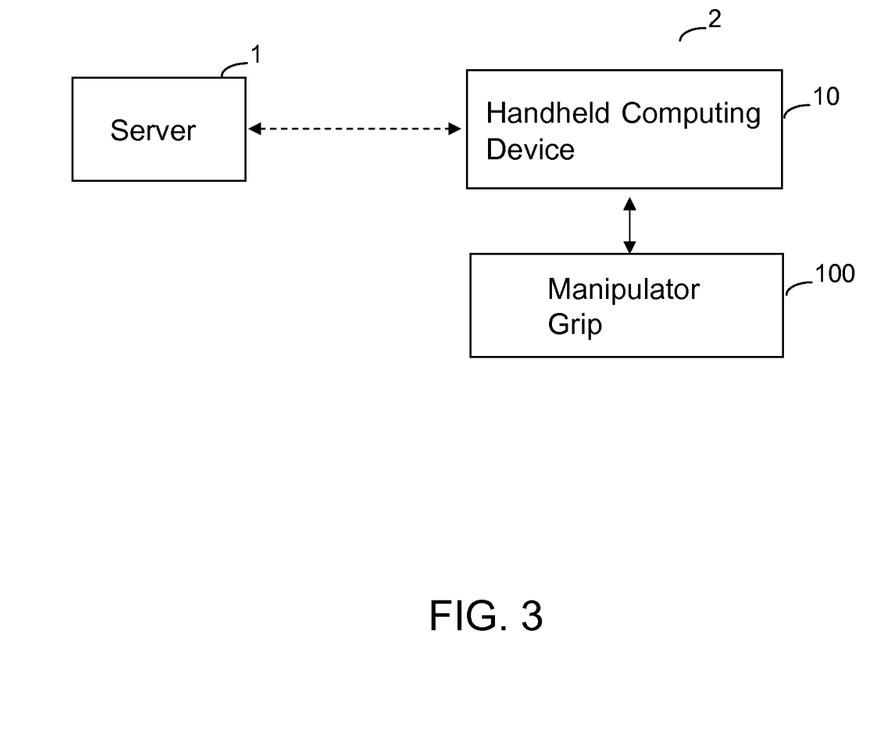
FIG. 3 is a diagram illustrating a network having a server and the handheld computing unit of FIG. 1.

The handheld computing unit 2 may communicate with a server 1 and receive information associated with the physical object 4 from the server 1 and transfer the captured data to the server 1, as shown in FIG. 3.

One of ordinary skill in the art would appreciate that the handheld computing unit 2, the handheld computing device 10 and the manipulator grip 100 may include components/ electrics/modules not illustrated in the drawings. In one example, the handheld computing unit 2 may have an onboard power source to satisfy power requirements of its onboard processor(s), user interfaces, and communication components in the unit 2. In another example, the handheld computing unit 2 may have a wireless/wired interface for communicating with the server (1 of FIG. 3). In further example, one of ordinary skill in the art would appreciate that the handheld computing device 10 includes a main logic board having a main processor for operating the computing device 10. The components of the handheld computing device 10 are electrically connected to the main logic board.

In the description, the terms "user", "operator" and "customer" may be used interchangeably. In the description, the terms "target object(s)", "physical object(s)", "item(s)", "article(s)", "goods" and "material" may be used interchangeably. In the description, the terms "characteristics" and "attributes" may be used interchangeably. In the description, the terms "grip" and "handle" may be used interchangeably. In the description, the terms "analysis frame" and "analysis field" may be used interchangeably.

The handheld computing device 10 is described in detail. The handheld computing device 10 acts as a stand-alone computer, and is also operable with the manipulator grip 100.

The handheld computing device 10 includes one or more user interfaces 11 (I/Fs), such as a display screen 12 (e.g., touch screen, graphic user interface) and keypad/keyboard. The user interfaces 11 can communicate with the processing blocks of the handheld computing device 10 (e.g., 16, 40, 42, 70, 72, 74, 76, 78). The handheld computing device 10 may include additional user interfaces, such as a speaker, a microphone, a speech recognition system, a volume controller, an indicator 14 (visual, audio indicators) or combinations thereof.

The display 12 displays in near real time an image of the physical object 4 being analyzed, allowing the user to manually aim the sensor at the desired location and zoom as required to place specific object characteristics within the analysis field. The handheld computing device 10 may use optical zoom, digital zoom or a combination thereof to zoom the image in the display. The handheld computing device 10 displays all data extracted from the physical object 4 continuously in the display screen 12, as well as signaling these using audio tones or voice messages via the indicator 14. This includes all successfully decoded/read identifiers (1D, 2D bar codes, RFID tags), all successful pattern matches, and successful OCR matches.

The display screen 12 may include a configuration screen (e.g., touch screen), through which the user operates the handheld computing device 10 or inputs data for the operations of the handheld computing device 10. The user may selectively activate or deactivate sensor components (e.g., image capturing/analyzing devices, scanners, RFID readers) in the handheld computing device 10 via the configuration screen (e.g., 208 of FIG. 4).

The user may input data/information using the user interface (e.g., touch screen, keypad) to assist capturing/identifying the characteristics of the physical object 4 (e.g., 212 of FIG. 4), associating the captured characteristics with the identification data, and verifying the identification data with the captured characteristics (e.g., 214 of FIG. 4). The user may input, via the user interface (e.g., touch screen, keypad), information on possible (anticipated/expected) identifiers, possible items (anticipated/expected physical objects), characteristics of the possible items, or combinations thereof. The possible identifiers input by the user may include a class of identifiers, such as a type of bar code symbology, bar code character length, or bar codes starting with a specific character. The server 1 may send, to the handheld computing unit 2, a list of the possible identifiers, a list of the possible items, characteristics of the possible items, a list of restrictions on valid identifiers/characteristics/items (negative list), or combinations thereof. The list of the possible identifiers, items and/or characteristics or the negative list may be used to validate the identification data without capturing additional characteristics of the physical object 4. The possible identifiers, items and/or characteristics or the negative list may be used to selectively activate or deactivate some of the sensor components in the handheld computing device 10.

The handheld computing device 10 includes a data processor 16, an interface 18 for the data processor 16 and the manipulator grip 100, and a data storage system 20. The data processor 16 communicates with the manipulator grip 100 through the interface 18. The interface 18 is an electrical interface to the data processor 16. However, the interface 18 may convert this electrical signaling to electrical, optical, or magnetic signaling data from the manipulator grip 100. The user interfaces 11 communicate with the data processor 16. The user interfaces 11 may be controlled by the manipulator grip 100 via the data processor 16.

The detection mechanism of the manipulator grip 100 communicates with the data processor 16 through the interface 18. The detection mechanism of the manipulator grip 100 may initiate zoom adjustment for image processing. The detection mechanism of the manipulator grip 100 may initiate determination of the distance to the physical object 4, selection of a sensor, and validation of the physical object's identification.

The data processor 16 may be a general purpose processor and mounted on the main logic board. The data processor 16 includes a plurality of software modules (algorithms) (FIG. 2) executed on the data processor 16. The software modules include, for example, data processing modules and data analyzing modules (e.g., 42, 70, 72, 74, 76, 78 of FIG. 2) as described in detail below. The software modules may further include a module (algorithm) 22 for optimizing the device components (e.g., selectively activating or enabling the components of the handheld computing device 10, setting parameters for the operations of the components, controlling the operations modes of the device 10), and a module (algorithm) 24 for coordinating and/or validating the object's identification data.

Figure 2:
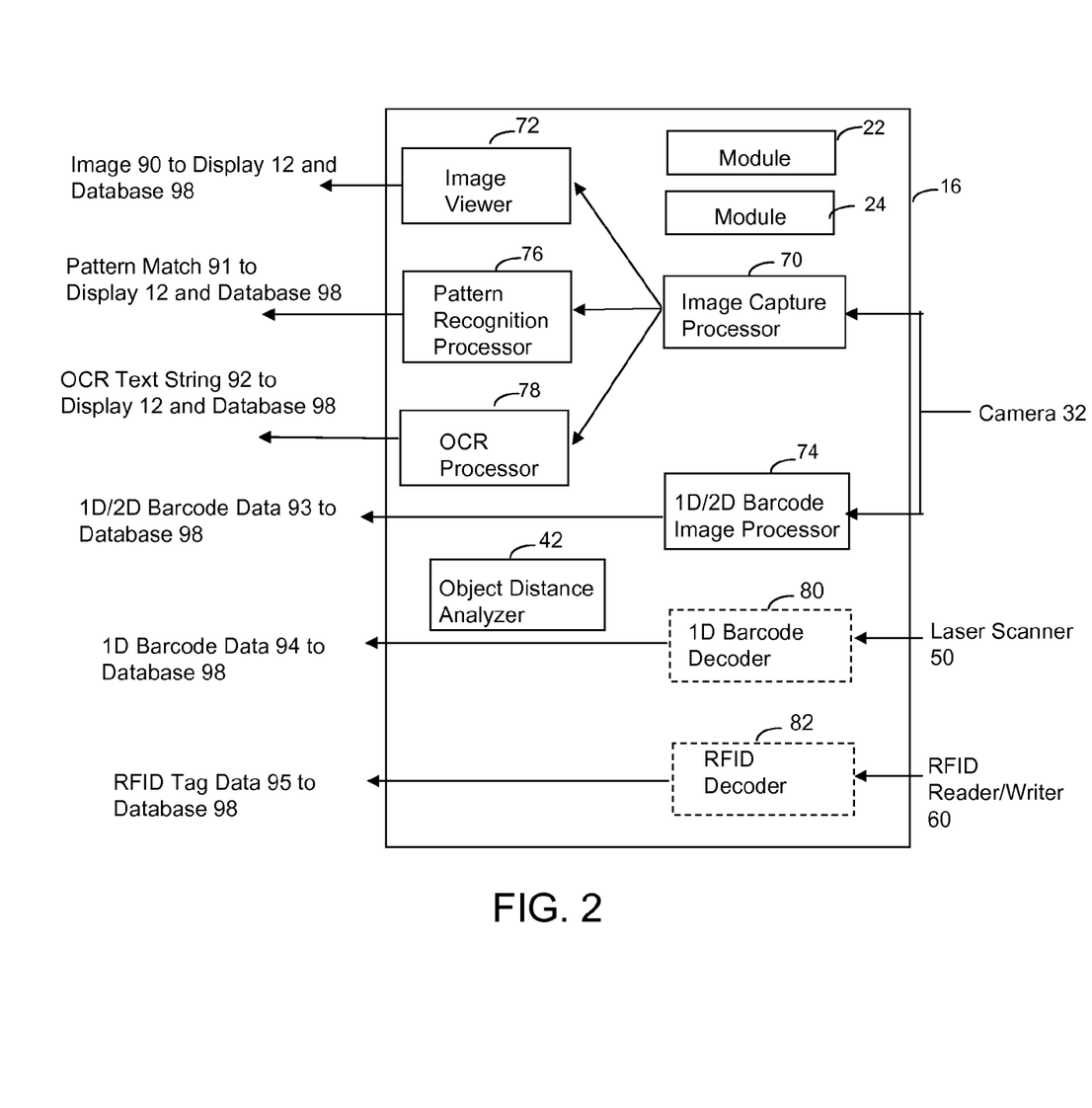
FIG. 2 is a diagram illustrating an example of a data processor in the handheld computing device of FIG. 1.

In FIG. 2, the elements 22, 24, 42, 70, 72, 74, 76, and 78 are shown as components of the data processor 16. However, the components of the data processor 16 are not limited to these elements. The data processor 16 may contain additional or different components as well understood by one of ordinary skill in the art.

The algorithm executed by the data processor 16 evaluates all the available characteristics in order to validate the object's identifier (e.g., bar code, RFID tag), and then it will associate the captured object characteristics with its data identifier in a database (e.g., 20, 98) for further processing. The algorithm executed by the data processor 16 may be configured to corroborate and/or validate the object identifiers through alternative sensors. In one example, the RFID tag 6 embedded in the physical object 4 may be validated by a certain bar code on the physical object 4, which in turn is corroborated by a pattern match against the manufacturer's logo on the physical object 4. In another example, the bar code attached to the physical object 4 may be validated by the detected characteristics of the physical object 4.

The handheld computing unit 2 includes a data storage system 20 and a database system 98. The data storage system 20 has a repository for storing information/data. The database system 98 has a database for storing, for example, pattern recognition source data, and OCR code data. The data storage system 20 is located in the handheld computing device 10. The database system 98 may be fully or partially in the handheld computing device 10. The database system 98 may be fully or partially integrated in the data storage system 20.

The data storage system 20 may store a list of possible items (anticipated/expected physical objects), a list of possible (anticipated/expected) identifiers, a list of characteristics of the possible items, a list of restrictions on valid identifiers/characteristics/items (negative list), or combinations thereof. The list may be sent from the server 1 to the handheld computing device 10. The list may be used to analyze captured data or validate the identification.

The handheld computing device 10 includes a plurality of capturing devices for capturing the characteristics of the physical object 4, through an optical path, a radio frequency (RF) path or a combination thereof. The characteristics of the physical object include an object identifier attached to the physical object 4 (e.g., bar code label, RFID tag). The characteristics of the physical object may further include the physical properties of the physical object 4, a text or graphic or image object printed/written on the physical object 4 (e.g., logo), or combinations thereof.

For the optical path, the handheld computing device 10 includes a sensor aperture 30 through which the handheld computing device 10 optically captures data of the physical object 4. For clarity and without loss of generality, the side of the handheld computing device 10 (or the handheld computing unit 2), having the sensor aperture 30 is referred to as the front side of the handheld computing device 10 (or the handheld computing unit 2). The back side of the device 10 (the unit 2) is the side opposite to the front side.

The capturing devices of the handheld computing device 10 include a camera 32. The camera 32 may be a digital color camera. The camera 32 may have an optical zoom mechanism with a zoom lens 34. The camera 32 may have passive and active auto-focusing capability. The auto-focus may be passive using image processing, or active using a rangefinder function. The camera 32 captures the image of the physical object 4 via the sensor aperture 30. The zoom enlarges object images obtained from the sensor aperture 30. The user aims the single sensor aperture 30 when operating the camera 32. An illumination source 36 is provided to the camera 32. The illumination source 36 may be external or adjacent to the sensor aperture 30 due to reflections back into the sensors. The user aims the single sensor aperture 30 when operating the illumination source 36.

The handheld computing device 10 includes an image capture processor 70, an image viewer 72, and a 1D/2D bar code image processor 74. The image capture processor 70 communicates with the camera 32, and processes data output from the camera 32. The image viewer 72 is provided for displaying on the display screen 12 graphical image 90 based on outputs from the image capture processor 70. The camera 32 provides image data to the image capture processor 70. The image capture processor 70 enhances and compresses the image and allows the image viewer 72 to display the image 90, for example, at slow speed video frame rates, on the display screen 12. The image capture processor 70 has a digital zoom function to enlarge a part of the image on the analysis field. The image capture processor 70 may have a dynamic resolution adjustment function to speed up the frame rate. The 1 D/2D bar code image processor 74 captures bar code image data output from the camera 32 and processes the bar code image to detect and decode a 1D/2D bar code attached to the physical object 4.

The image capture processor 70, the image viewer 72 and 1D/2D bar code image processor 74 are executed on the data processor 16. The image capture processor 70, the image viewer 72 and the 1D/2D bar code image processor 74 may be programmable modules (algorithms) and be optimized by the user's inputs so that they are selectively activated or deactivated at a certain mode or certain condition associated with the user's inputs. In one example, the image processor 70 is active unless it is disabled by the user. The handheld computing device 10 allows the user to program or optimize the modules 70, 72 and 74 via the user interfaces on the device 10 (e.g., configuration screen on the display 12, keyboard).

The handheld computing device 10 may include image analyzing modules, such as, but not limited to, a pattern recognition processor 76, an optical character recognition (OCR) processor 78, or a combination thereof. The pattern recognition processor 76 analyzes the pattern of the image output from the image capture processor 70. The OCR processor 78 decodes a text in the image output from the image capture processor 70.

The pattern recognition processor 76 and the OCR processor 78 are executed on the data processor 16. The data processor 16 has enough computing performance (higher performance CPU) and memory (e.g. flash memory) to effectively implement pattern recognition and OCR algorithms in a timely fashion. The pattern recognition processor 76 and the OCR processor 78 may be programmable modules (algorithms) and be optimized by the user's inputs so that they are selectively activated or deactivated at a certain mode or certain condition associated with the user's inputs. The activation of the analyzing modules (barcodes, pattern match, OCR) may be delayed until the image has stabilized sufficiently (i.e., the user has stopped moving the unit). Once activated the camera will take a snapshot of the item. The handheld computing device 10 allows the user to program or optimize the modules 76 and 78 via the user interfaces on the device 10 (e.g., configuration screen on the display 12, keyboard).

The handheld computing device 10 may include a laser scanner system 50 for scanning a bar code label via the optical path, an RFID reader system 60 for reading the tag 6 attached to the physical object 4 via the RF path, or a combination thereof. In FIG. 1, the laser scanner system 50 receives optical data via the sensor aperture 30. The user aims the single sensor aperture 30 when operating the laser scanner system 50.

The laser scanner system 50 may include, for example, but not limited to, a long range laser scanner 52, a standard range laser scanner 54 or a combination thereof. The handheld computing device 10 may include a 1D bar code decoder 80 for decoding a bar code based on outputs from the laser scanner system 50 and outputting 1D bar code data 94. The 1D bar code decoder 80 may be a software module, or an electronic circuit.

The RFID reader system 60 may include, for example, but not limited to, a UHF RFID reader 62, an LF RFID reader 64, an HF RFID reader 66 or combinations thereof. The RFID readers 62-66 may be RFID readers/writers that contain functionality of reading information from the tag and also writing information on the tag 6. The handheld computing device 10 may include an RFID encoder/decoder 82. The RFID encoder/decoder 82 decodes tag information based on outputs from the RFID reader/writer system 60 and outputs RFID tag data 95. The RF data is generated by the reader/writer (e.g., 62, 64 or 66). The RFID encoder/decoder 82 sends/receives raw bitstream data to/from the corresponding reader/writer. In the RFID encoder/decoder 82 the raw data bitstream is analyzed and converted to a message containing the decoded RFID data based on the type of tag used. Checksums, error correction, protocols and other overhead associated with lossy channel transmission is also addressed in the RFID encoder/decoder 82.

The RFID encoder/decoder 82 may be a software module or an electronic circuit. The RFID encoder/decoder 82 may be combined with the RFID reader/writer (e.g., 62, 64 or 66) into a single electronic module. The 1D bar code decoder 80, the RFID encoder/decoder 82 or a combination thereof may be software modules executed on the data processor 16. The 1D bar code decoder 80 and the RFID encoder/decoder 82 may be programmable modules (algorithms) and be optimized by the user's inputs so that they are selectively activated or enabled at a certain mode or certain condition associated with the user's inputs. The handheld computing device 10 allows the user to program or optimize the modules 80 and 82 via the user interfaces on the device 10 (e.g., configuration screen on the display 12, keyboard).

The user may operate the triggers/switches on the manipulator grip 100 to generate fine zoom adjustment signals for controlling the image viewer 72, the pattern recognition processor 76, the OCR processor 78, the bar code image processor 74 or combinations thereof, thereby allowing the user to fill the analysis field of the display screen 12 with the appropriate view of the physical object 4. This may include the selection of only one of multiple object characteristics (bar codes, text, or graphics).

The pattern recognition processor 76, the OCR processor 78, the laser scanner 50, and the RFID reader 60 are optional. In addition, these modules can be activated or enabled via the user interfaces when installed.

When the pattern recognition processor 76 is installed and enabled, the data processor 16 searches the database in the data storage system 20 and provides pattern recognition source data from the data storage system 20 to the pattern recognition processor 76 if available. If a pattern match is determined for the image in the analysis field on the display screen 12, the pattern recognition processor 76 overlays the match result 91 on the display screen 12.

Where the pattern recognition of the object itself may not be feasible, the data processor 16 may use the decoded object identifier data from any one or more of the 1D/2D bar code image processor 74, 1D bar code decoder 80 or the RFID encoder/decoder 82 to search its database in the storage system (e.g., 20, 98) for an image of the object and instruct the pattern recognition processor 76 to display this image for the user on the display 12. The user, presented with a picture or pictorial of the object on the display, can then confirm or reject the pattern recognition.

For example, the orientation of a complex 3D item, such as an unpackaged industrial valve, may vary such that a 3D 3-axis rotational pattern matching process is overly CPU intensive, slow or unreliable, or the source pattern is too difficult to create—any of which would render pattern matching infeasible.

The user validates whether to accept the pattern match by using the grip 100 or user interface (e.g., keypad, touch screen) on the computing unit 2.

In some applications, patterns evaluated would be predictive, based on other captured identifiers if available, on the items expected (as part of the workflow state), or the list of anticipated items. Thus, the handheld computing device 10 may use such information to improve the chances of a match and reduce computing effort/match time. For example, the user may signal that the item is in the anticipated list, in order to avoid a more exhaustive but longer matching process.

When the OCR processor 78 is installed and enabled, the data processor 16 simultaneously initiates the OCR processor 78 which will attempt to decode any text contained in the analysis field of the display screen 12. Where successful, the OCR processor 78 overlays the decoded text 92 on the display screen 12.

It may be time consuming to find the right object in a scene to process, by pattern recognition and OCR, in particular, when there may be several boxes or items in the default camera view. However, the manipulator grip 100, the zoom control (34) and the analysis frame ensure quickly focusing on the desired object/characteristic. Generally, the decode reliability of the pattern recognition and OCR is less high. Thus, the pattern recognition and OCR may be used primarily for corroboration in the device 10.

When any of the 1D/2D bar code image processor 74, the 1D laser scanner decoder 80, and the RFID encoder/decoder 82 read the identifier successfully, the receipt of valid data may be indicated on the display screen 12. The indicator 14 (e.g., audio or visual indicator) may also be activated.

The handheld computing device 10 includes a database 98 for object data associations. In FIG. 1, the database 98 is illustrated separately from the data storage system 20. However, the database 98 may be located in the data storage system 20. In FIG. 1, the database 98 is located in the handheld computing device 10. However, in another example, the database 98 may be in the server 1 of FIG. 3. In a further example, the database 98 may also be partitioned between the server 1 and the handheld computing device 10.

The processing blocks (e.g., the object distance analyzer 42, the image viewer 72, the pattern recognition processor 76 and the OCR processor 78, the 1D/2D bar code image processor 74, the 1D bar code decoder 80, and the RFID encoder/decoder 82) communicate with the database 98. The database 98 stores, for example, image 90 from the image viewer 72, pattern matching result 91 from the pattern recognition processor 76, OCR text string data 92 output from the OCR processor 78, 1D/2D bar code data 93 output from the 1D/2D bar code image processor 74, 1D bar code data 76 output from the 1D bar code decoder 80, RFID tag data 95 output from the RFID encoder/decoder 82. Every successful object attribute decoded via any of the data capturing/analyzing processors 74, 76, 78, 80, and 82 will be recorded in the database 98. A compressed image 90' of the object from the image viewer 72 may also be captured and associated in the database 98. All of these data are linked or associated with the specific object 4 within the database 98.

The handheld computing device 10 includes a rangefinder 40 for determining a distance to the physical object 4 based on optical data from the sensor aperture 30, and an object distance analyzer 42 for analyzing the distance to the physical object 4. The user aims the single sensor aperture 30 when operating the rangefinder 40.

The rangefinder 40 is an electronic circuit including an optic function. The rangefinder 40 includes a mode for projecting a visible aiming dot (beam) at a certain distance. When activated it continuously measures the physical distance to the object located at the aiming dot. The rangefinder 40 outputs a data stream containing updated distance values ('distance to object' information). The aiming dot assists the operator to manually move the manipulator grip 100 to ensure the aiming dot is centered on the desired object. The user can manually turn on/off the rangefinder 40. The data processor 16 can issue the instruction to turn on/off the rangefinder 16 directly. The instruction from the data processor 16 may go to the rangefinder 16 through the distance analyzer 42.

The distance analyzer 42 evaluates the distance values from the rangefinder 40, and outputs instructions to enable or disenable the sensor modules (e.g., scanners, readers/writers) as well as the illumination source 36, the camera 32 and the zoom. For example the instruction from the distance analyzer 42 may be used to adjust the zoom function for the image viewer 72 for the best view of the physical object 4 on the display 12. In this case, the user predefines a default type of object that is normally viewed. The zoom is then set based on the default type of object and the distance to the object. For example, the default type of object may be a courier envelope, an automobile license plate, a typical shipping box or a pill bottle.

The rangefinder 40 includes, for example, but not limited to, an LED laser rangefinder, an image processing rangefinder, or combination thereof. For example, the LED laser rangefinder projects the aiming dot and determines the distance to the object by measuring the time for the laser light to be reflected back from the object. The rangefinder 40 may use image processing from the camera 32, determining range in the same way digital cameras do presently. However in certain situations digital camera rangefinders are ineffective since they depend on some number of light-dark transitions to determine sharpness. Thus the rangefinder 40 may operate the LED laser rangefinder (similar to a laser measuring tape).

The handheld computing device 10 may have a mode where the operator enables an enhanced algorithm that combines the passive rangefinding via image processing from the camera 32, with the active rangefinding from the laser LED rangefinder. This allows for the most accurate and reliable rangefinding data. This mode may be activated when the laser LED rangefinder alone is inaccurate.

The handheld computing device 10 may have an "aiming mode" in which an aiming beam is emitted via the sensor aperture 30 in order to illuminate an aiming dot on the object of interest. For example, if there are multiple objects at varying ranges in close proximity (e.g., near and far boxes overlapping in the view), the user may use the aiming mode in order to target a specific object.

Alternatively the handheld computing device 10 may display the rangefinder targeting marker (e.g., cross hair) in the display 12 and the users re-aim the device 10 to put the marker onto the portion of the image they wish to focus on. The rangefinder 40 and the display processor will ensure that the rangefinder beam was coincident with the location of the targeting marker in the display 12. This avoids the need for a visible aiming dot, which may be difficult to see in bright ambient light.

In FIG. 1, the object distance analyzer 42 is located separately from the data processor 16. However, the object distance analyzer 42 may be integrated or embedded in the data processor 16. In one example, the distance analyzer 42 is a software module having a logical algorithmic function and executed in the data processor 16. The distance analyzer 42 may include a state machine for evaluating the distance values, which takes pre-defined criteria from, for example, the database or configuration setup. In FIG. 1, the rangefinder 40 is located separately from the camera 32. However, in another example, the rangefinder 40 may be partially or fully integrated into the camera 32. The rangefinder 40 may be partially integrated into the laser scanner 50 when the computing device 10 employs the laser scanner 50.

The handheld computing device 10 dynamically determines the appropriate activation of the sensors (e.g., bar code image processor 74, laser scanner 50, RFID reader 60, or combinations thereof) based on predetermined criteria and the distance to the physical object 4. The criteria for activating any of the sensors are configurable. The handheld computing device 10 may dynamically determine the appropriate activation of the analyzing modules (e.g., pattern recognition processor 76, OCR processor 78, or a combination thereof) based on the distance to the physical object 4. For example OCR may not be attempted if the object is beyond a certain distance. Information from the rangefinder 40 is also used to activate or deactivate the illumination source 36. The handheld computing device 10 may be configured by inputting the criteria via its user interfaces (e.g., configuration screen on the display screen 12, keyboard etc).

As a battery powered device, the runtime of the unit 2 is one of the key performance characteristics. The power consumption of certain scanners, in particular UHF RFID is significant in comparison to the rest of the system. The handheld computing device 10 restricts, based on the outputs from the distance analyzer 42, the triggering of the sensors. This minimizes the power consumption of the computing device 10.

One of the criteria for activating or deactivating an available sensor is a distance range for the sensor. The bar code scanners and RFID scanners have specific read distance ranges. The handheld computing device 2 allows the user to configure the device 10 by inputting the distance ranges for the available sensors in the handheld computing device 10.

Based on the output from the rangefinder 40 and the distance range criteria, the object distance analyzer 42 analyzes the distance between the physical object 4 and the sensors to determine whether to use one or more of the RFID scanners (scanner for long range objects, scanner for near range objects, or scanner for further near range objects) or one or more 1D or 2D bar code scanners (scanner for distant objects, scanner for medium range objects, or scanner for near range objects). For example, the long range scanner 52 may only be operable over 1 m to 10 m. The high density 2D imager 74, on the other hand, might have a maximum depth of field of 25 cm. The RFID readers 60 likewise are constrained: LF and HF readers 64 and 66 may have a maximum 10 cm range, while UHF reader 62 may have 5 or 10 m range. Passive HF and LF RFID readers 66 and 64 may not be activated unless the distance analyzer 42 has confirmed that the physical object 4 is very close to the device 10.

Other predetermined criteria for activating or deactivating an available sensor include the enabled list of identifiers. Certain bar code symbologies by their nature have restricted read ranges. For example, a 5 mil bar code symbol cannot be read from meters away. The handheld computing device 2 allows the user to configure the device 10, if desired, by enabling only those identifiers they anticipate encountering in normal use.

In a further example, the handheld computing device 10 may have a special mode available when an identifier is found in the object image (i.e. the camera 'sees' that there is a bar code on the item) but it could not be decoded based on the symbologies enabled. In this mode, all possible symbologies are temporarily enabled to see if the identifier happened to be one not normally enabled.

In one scenario, the handheld computing unit 2 may be used as follows: the operator inputs the criteria for activating some modules, into the handheld computing device 10. The criteria include what symbologies/codes are to be enabled. The sensor aperture 30 is aimed at the physical object 4. A signal to initiate the selection process of selecting an appropriate sensor is received at the data processor 16, which may be provided from the manipulator grip 100 via the interface 18. The data processor 16 may instruct the camera 32 to focus on the physical object 4, using the zoom 34 as appropriate. The data processor 16 enables the rangefinder 40 which provides the distance to object information to the distance analyzer 42. The distance analyzer 42 passes this information to the camera 32 and the image processor 70, which zooms according to predetermined criteria (if any). The distance analyzer 42 evaluates predetermined criteria to control which sensors/analyzing modules are to be activated. Depending on the measured distance to the physical object 4 and the predetermined criteria, the handheld computing unit 2 performs differently.

In this case, based on the distance to the physical object 4 and the preselected symbologies/codes, the algorithm initiates the long range 1D laser scanner 52 for distant objects, the standard range 1D laser scanner 54 for medium range objects, or the bar code image processor 74 for near range objects. Evaluation of the object brightness by the image processor 70 combined with information from the rangefinder 40 determines the activation of the illumination source 36. The bar code image processor 74 also utilizes the rangefinder 40 information to determine utilization of the illumination source 36.

At the same time, the data processor 16 enables, for example, the UHF RFID reader 62 for long range objects, the LF RFID reader 64 for near range objects or the HF RFID reader 66 for further near range objects, in dependence upon the output from the distance analyzer 42. It is not necessary to install every RFID reader type. No attempt is made to acquire tags within objects beyond the range of the UHF reader 62 based on the analysis of the distance analyzer 40.

In another scenario, the handheld computing unit 2 may be used as follows: initially the extents of an object are captured in the analysis field, and the bar code image processor 74 finds and highlights any/all bar codes on the physical object 4. If the bar codes can be decoded, the highlighting goes a specific color (e.g., green) or flashes for example. The pattern recognition processor 76 may use the profile of the physical object 4 and if correct the overlaid extents goes green. This may be considered sufficient to validate the identifier and the task is complete. If the bar codes cannot be read though, the highlight goes another specific color (e.g., red) or flash for example, and the user can press a button on the manipulator grip 100 to zoom in on the problem bar code. Then an exception algorithm on the data processor 16 may attempt to read the text on the bar code label using OCR for example. The algorithm for the above operation is an example only, and is changeable and configurable.

In a further example, if there is conflict among captured data, a prioritized voting scheme may be used—decoded bar codes having highest priority, others less—pattern recognition and OCR having the lowest reliability.

One example of the manipulator grip 100 is described in detail. The manipulator grip 100 has a plurality of triggers/switches operated by the user and converts the user's finger movements to instructions for operating the handheld computing device 10. The manipulator grip 100 utilizes a shape, contour and material such that when all these detection mechanisms are being operated simultaneously, the user is able to hold and aim the handheld computing device 10 without loss of grip on the manipulator grip 100. The signaling interface between the manipulator grip 100 and the handheld computing device 10 may take various forms, including electrical, magnetic or optical or combinations thereof. In one example, two signal lines provide a source of power to the grip 100 and switch closures are signaled by a simple optocoupler arrangement.

In one example, the manipulator grip 100 includes a) a rocking switch mechanism that is operated by the fingers of the user and has at least two states, b) a momentary type switch operated by squeezing the grip 100, and c) a single state switch operable by another finger of the user.

Figure 6:
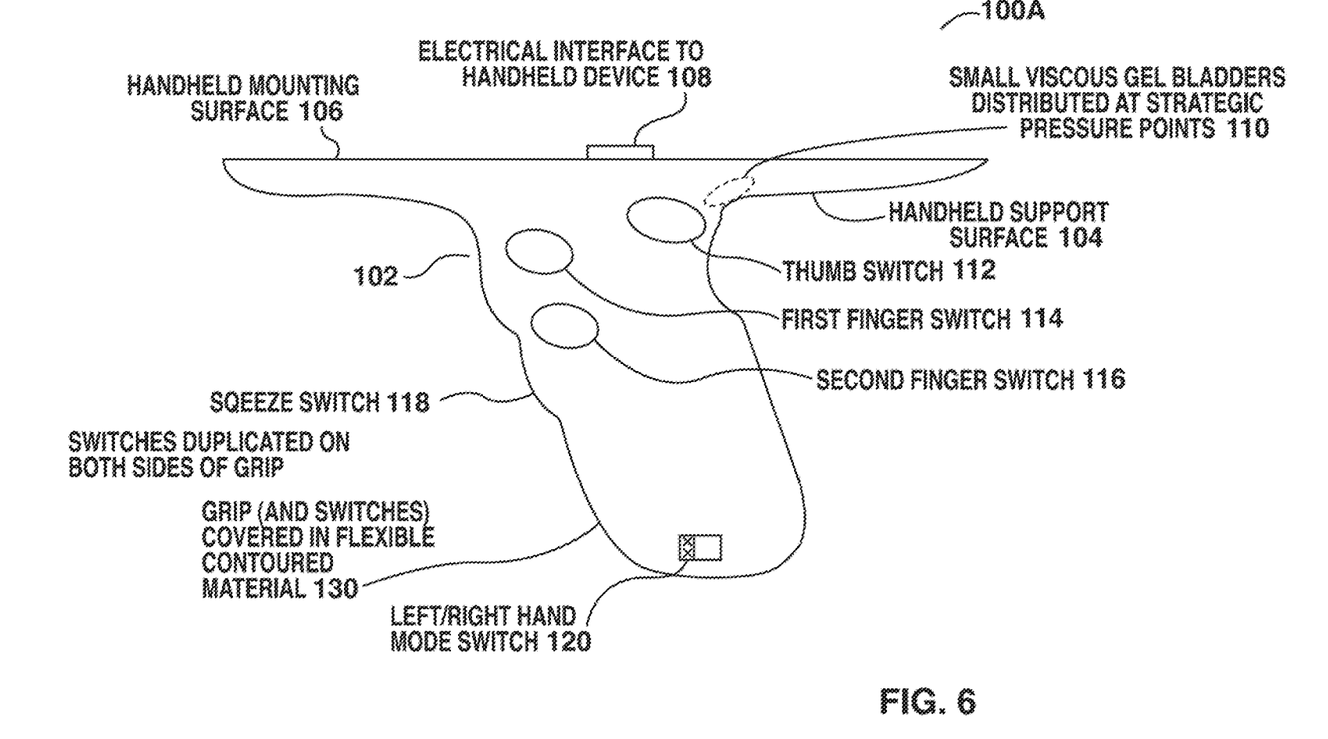
FIG. 6 is a side view illustrating one example of the manipulator grip of FIG. 1.

The manipulator grip 100A of FIG. 6 is one example of the manipulator grip 100 of FIG. 1. In FIG. 6, one side of the manipulator grip 100A is illustrated. The manipulator grip 100A is an ambidextrous one-handed data entry device.

The manipulator grip 100A has an enclosure 130 that completely covers the components of the manipulator grip 100A. The enclosure 130 may be formed by a tough, however, flexible non-slip sheathing material, which reduces the operator's fatigue.

The enclosure 130 has a grip surface 102 shaped for grasping by a hand (not shown) of the user and for fitting the palm of the user. The enclosure 130 has a handheld support surface 104 having an upper surface 106 contoured for mounting the handheld computing device (e.g., 10 of FIG. 1). On the upper surface 106, an interface 108 is employed. The interface 108 communicates with the interface (e.g., 18 of FIG. 1) of the handheld computing device. The interface 108 may be an electrical interface, an optical interface or a magnetic interface.

One or more small bladders 110 of a viscous gel are distributed over the manipulator grip 100A at strategic points beneath the sheathing. These bladders 110 allow certain areas on the manipulator grip 100A to contour to a specific user's hand. They address the ergonomic differences when the manipulator grip 100A is used left handed rather than right-handed.

A thumb switch 112 is located on each side of the manipulator grip 100A for both of the left and right hand thumbs. Only one of the thumb switches is enabled at any one time via a mode switch 120. The thumb switch 112 is a spring loaded switch. The thumb switch 112 creates a signal at the interface 108 only while the switch 112 is being depressed, and is spring loaded. This switch 112 provides tactile feedback to the user.

A first finger switch 114 and a second finger switch 116 are located one each side of the manipulator grip 100A for both of the left and right handed operators. A pair of the first finger switch 114 and the second finger switch 116 in each side forms a mechanical rocker switch. Only one of the rocker switches is enabled at any one time via the mode switch 120. When the switch 114 is depressed, the switch 116 elevates, and vice versa. There is an intermediate state where neither the switch 114 nor the switch 116 is active. This rocker switch is spring-loaded and returns to the inactive (intermediate) state when neither switch is being pressed. Each switch 114 or 116 creates a signal at the interface 108 when they are depressed. Tactile feedback is provided.

A squeeze switch 118 is formed in the front side of the manipulator grip 100A. The squeeze switch 118 incorporates a relatively large area of the front edge of the manipulator grip 100A. The squeeze switch 118 is a momentary type switch with a pivot rod. The pivot rod extends nearly the full length of the manipulator grip 100A beneath the sheathing. The pivot rod is spring loaded. When the front surface of the manipulator grip 100A is gently squeezed (by any or all of the four fingers), the pivot rod is moved and a signal is created at the interface 108 as long as the switch 118 is activated. Tactile feedback is provided.

Outputs from the switches 112, 114, 116 and 118 are interpreted by the data processor 16. The user may associate outputs from each switch with a specific operation (e.g., zooming, scanning, start and stop of data capturing, evaluating, validating, etc).

Referring to FIGS. 1-6, in one scenario, the handheld computing unit 2 may be operated using the manipulator grip 100A, as follows:

a) Scanning is initiated by squeezing the manipulator grip 100A, activating the squeeze switch 118. This instructs the handheld computing device 10 to start image acquisition and rangefinding.

b) The operator uses the manipulator grip 100A to aim the sensor aperture 30 at the desired object and monitors the display screen 12 to see if the rangefinder 40 adequately sets the image camera zoom 34. If small additional zoom adjustments are required, the operator uses the switches 114 and 116 to toggle the zoom 34 in and out until it is satisfactory.

c) The operator monitors the results of the various acquisition sensors on the display screen 12. Alternately audio feedback may be provided via the indicator 14. When satisfactory, the operator quickly presses and releases the thumb switch 112 to accept the data and terminate the data capture.

If the operator is performing manual image recognition (comparing a retrieved image of the object to that being scanned), the operator may press the thumb switch 112, for example, twice (double clicking) to indicate acceptance of the data and terminate the activity.

When the operator clicks the thumb switch 112, this action links any scanned identifiers to the object displayed for manual recognition. For example, the system may instruct the operator to pick 10 tubs of a specific ice cream and place them into a specific box. Each time the operator double clicks, the system acknowledges that a tub has been picked. The system will then update the master inventory (one less ice cream tub), and add one more tub to the manifest for the box being filled. There are two activities occurring: one being collecting and linking identifiers for the physical object, another being signaling the system that some task or step has been completed.

It is well understood by one of ordinary skill in the art that "double clicking" is one example, and the switch may be clicked in different ways, such as a single click. If the operator always does manual recognition of an item, the device may be programmed to complete the task on a single click.

In a further scenario, the handheld computing unit 2 may be operated using the manipulator grip 100A as follows:

The operator aims the sensor(s) of the handheld computing device 10 at an object of interest (the physical object 4) requiring identification/data extraction. The operator activates acquisition by squeezing the squeeze switch 118 of the manipulator grip 100A.

The rangefinder 40 activates and determines a range to the physical object 4. The operator may ensure that the aiming dot generated by the rangefinder 40 is centered on the desired object. Depending on the distance to the physical object 4, the handheld computing unit 2 performs differently.

If the range exceeds 10 m, no sensors will be activated and the user will be notified via the user interface, such as audible indicator (14). The handheld computing unit 2 reverts to image capture mode (picture taking).

If the physical object 4 is at far range (greater than 5 m and less than 10 m), then the handheld computing unit 2 assumes its data is UHF RFID or large format 1D bar code.

If present, the UHF RFID scanner 62 activates searching for the RFID tag 6. Simultaneously, the long range laser scanner 52 beam energizes and sweeps across the physical object 4. The operator trains the visible long range scanner beam on the object's bar code (if applicable). If ambient light is too intense to see the beam, the operator fixes the bar code within the display frame markers using the zoom rocker switches. These are calibrated to place the laser scanner beam on the bar code when the bar code is centered in the display frame markers. The camera 32 takes successive photographs of the article.

If the physical object 4 is at medium range, then there are many alternatives for the identification method as follows:

The camera 32 focuses/zooms per the rangefinder data and takes continuous low frame rate pictures, and displays them for the operator. While squeezing the manipulator grip 100, the operator presses the zoom rocker switches 114 and 116 to zoom in/out on the object of interest as indicated by frame markers in the display 12 while adjusting the direction of the sensor.

The image capture processor 70 determines that the image is stabilized when the zoom function is no longer used and the motion of the image is minimized. Once the image capture processor 70 determines that the image is stabilized, the image capture processor 70 sends a control signal to the 1D/2D barcode image processor 74 to detect 1D or 2D barcode. The objects within the frame markers are then also processed for pattern matching 76 and OCR 78.

If the distance analyzer 42 determines that the physical object 4 is located beyond a distance for capturing and analyzing a barcode by the barcode image processor 74, or depth of field is insufficient for an appropriate bar code size, the handheld computing unit 2 triggers the 1D laser scanner 52 or 54 if present, and the operator aligns the laser beam across the bar code on the object 4. The handheld computing unit 2 will still attempt to pattern match the object and associate the read bar code with the appropriate pattern source. In addition, the handheld computing unit 2 may be programmed to capture a full or filtered image of the object and associate this data with the read bar code, even if it cannot be pattern matched.

If the handheld computing unit 2 determines that a valid RFID tag (6) is in range, it uses one of several optical modes to associate this RFID data with a physical article. Depending on the range to the object determined by the rangefinder 40, the optical system in the handheld computing unit 2 may take a simple color photograph of the object, may pattern recognize the object from a pre-determined authorized list, or may display a picture of the object from a database, based on data in the RFID tag and request that the user verify it. Objects with associated RFID tags and bar codes would be validated by reading the bar code.

For data rich environments, an intuitive method may be used to avoid accepting data until the user is certain that it is the data he wants. In this mode, the camera 32 takes continuous pictures, and the relative motion of both the sensor and the zoom function are monitored by the image processor 70. Data is not accepted until the motion has stabilized sufficiently. The handheld computing device 10 waits until the motion has been stabilized sufficiently so that the content of the analysis frame is what the user intends.

The handheld computing unit 2 may include an algorithm (e.g., 22) for characterizing the operator's activities over time to adjust the stabilization parameters. The algorithm may be in the data processor 16, and associated with the image processor 70 and the data storage system 20.

The user may teach the handheld computing unit 2 by stabilizing the image then pressing a button (e.g., 112, 114, 116) on the manipulator grip 100. Over a certain number of repetitions the system can learn how much residual motion shake is present when the user has framed the object data sufficiently. After learning, the user no longer needs to operate any button/switch to capture the data. If this method is found to be unsuitable, the user may accept the displayed data by depressing a switch (e.g., thumb switch 112) on the manipulator grip 100.

The handheld computing unit 2 is usable in many applications as shown below. It would be well understood by one of ordinary skill in the art that the application/configuration of the handheld computing unit 2 would vary, depending on the features of the application.

In one example, the physical object 4 has a row of truck tires that have an embedded UHF RFID tag, and a sticky label on the treads that includes text, model numbers and a 1D bar code. If the UHF reader were activated in the vicinity of the row of tires, it could read many different tags. The user aims the unit 2 at a specific tire by using an aiming dot that is illuminated on the specific tire label of interest by the rangefinder 40, and the scanning process is initiated. First the rangefinder 40 adjusts zoom so the analysis field contains the complete tire sticky label. Then the bar code is read and stored. Then RFID tags are read. Using the bar code, the correct RFID tag is chosen from those read (the RFID tag would have the part number in it). An image of the sticky label is captured—all of these data are linked together in the database 98. Next the OCR processor 78 scans the sticky label and recognizes the printed tire model number which may be in larger text. This model number is evaluated against an acceptable list of part numbers (where the bar code contains only the tire part number, not its model number) contained in the database 98. In this example the bar code is used to validate the correct RFID tag and the OCR's model number validates the bar code. The tire model number is displayed in large text on the display, or may be spoken via a speaker. Since the user may be sorting the tires by model number they may use this as an additional validation that they have the right part in the right place.

Another example is a 'broken case' distribution centre. Cosmetic products are being picked from bulk cartons and packed in mixed boxes (more than one type of product is in the box) for specific customer orders. The warehouse buys bulk products from the manufacturers, relying on the UPC codes applied by the manufacturer to identify the product (remember the products have been removed from their shipping cartons). The cosmetics have different sized, shaped & colored containers (shampoos, hairsprays, etc). The general profile and color of the container is captured in the patterns database and linked to a specific UPC code. When the product UPC code is scanned & recorded using the bar code image processor 74, the photographic image of the product is compared against the size, shape & color in the pattern database 98 (note to scan the UPC code, the product needs to be in a certain orientation—so the relationship of the UPC code to the profile of the product pattern can be validated as well). If they match the bar code is accepted and the user proceeds to pack the product in the box. If they don't match, a photograph of the required product is displayed for the user and they are given the option to accept or reject whether the requested product (the displayed picture) is the same as the product being picked. If they indicate the product is the correct one, but its UPC bar code does not match the database, an exception report will be generated to review whether the original manufacturer has changed the UPC code for that product.

A further example is an operation at a clothing manufacturer. A manufacturing line is fabricating 3 different types of clothing in adjacent assembly lines. The clothing has a RFID tag embedded in it during manufacture, but for cosmetic reasons no bar codes are printed on or associated with the clothing. Before packing each piece of clothing, the user scans the garment—simultaneously reading the RFID tag and also taking a close up picture of the lapel, for example. The data in the RFID tag correlates to a certain pattern of the cloth (weave, pattern, colors, etc), and the image is pattern matched. Matching the garment material to the RFID tag validates the tag and the garment is packed. If the 3 types of clothing being manufactured are of different cloth, the pattern matching can be fairly simple and reliable.

In the supply chain, the bar codes and RFID tags may be applied by the original manufacturer and then used by subsequent material handling companies. Secondary handlers do not want to apply additional bar codes if they can be avoided. These companies would prefer to utilize Original Equipment Manufacturers (OEMs) bar codes/RFID tags to track the item through their facilities. Thus, data integrity is improved when the OEM identifier can be verified/validated using additional processes at these other facilities.

For example, a material handler may expect a certain sequence of Universal Product Codes (UPCs) or just one specific code to be associated with a certain physical object. The handheld computing device 10 can be programmed with a picture of the item or a printed text or graphical object (e.g., logo) on the physical object 4, and can then optically pattern match the physical object 4 to the UPC code read from it. This assures the material handler that the UPC code assignments in his system are still valid and match the goods as expected.

According to the embodiments of the present invention, there could be a significant reduction in inventory carrying costs, especially for large operations. More material would reach the end customer on time even if there might be problems with material identification. Material handling personnel will be more productive, and able to accurately identify goods that employ a wide variety of identification technologies. Identification of the goods can be validated using multiple data sources to ensure data accuracy and security.

One or more currently preferred embodiments have been described by way of example. It will be apparent to persons skilled in the art that a number of variations and modifications can be made without departing from the scope of the invention as defined in the claims.

What is claimed is:

1. A handheld ergonomic data input device for operating a handheld computing device having a sensor, comprising:
    an enclosure having a grip surface contoured to fit the palm of a user's hand and a support surface for mounting the handheld computing device;
    a detection mechanism for detecting the user's action on the data input device, including:
    a rocker switch having at least two states and operated by first and second fingers of the hand; a single state switch operated by a third finger of the hand; and
    a squeeze switch operated by squeezing the grip with the hand.

2. A handheld ergonomic data input device according to claim 1, wherein the rocker switch and the single state switch are formed in each side of the handheld ergonomic data input device.

3. A handheld ergonomic data input device according to claim 1, further comprising: an interface for transferring signals output from the detection mechanism to the handheld computing device, via optical signaling, electrical signaling or magnetic signaling.

* * * * *